United States Patent
Yabashi

(10) Patent No.: US 10,272,855 B2
(45) Date of Patent: Apr. 30, 2019

(54) GROMMET AND GROMMET ATTACHMENT STRUCTURE

(71) Applicant: Sumitomo Wiring Systems, Ltd., Yokkaichi, Mie (JP)

(72) Inventor: Tomohiro Yabashi, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/921,741

(22) Filed: Mar. 15, 2018

(65) Prior Publication Data
US 2018/0265018 A1 Sep. 20, 2018

(51) Int. Cl.
| | | |
|---|---|---|
| *B60R 16/02* | (2006.01) |
| *H02G 3/22* | (2006.01) |
| *F16L 5/02* | (2006.01) |
| *H01B 17/58* | (2006.01) |
| *F16L 5/10* | (2006.01) |
| *H02G 3/04* | (2006.01) |

(52) U.S. Cl.
CPC .......... *B60R 16/0222* (2013.01); *F16L 5/02* (2013.01); *F16L 5/10* (2013.01); *H01B 17/583* (2013.01); *H02G 3/22* (2013.01); *H02G 3/0468* (2013.01)

(58) Field of Classification Search
CPC ......... B60R 16/0222; F16L 5/02; H02G 3/22; H01B 17/583
USPC ...................... 174/152 G, 153 G; 16/2.1, 2.2
See application file for complete search history.

(56) References Cited

U.S. PATENT DOCUMENTS

| | | | | |
|---|---|---|---|---|
| 4,928,349 A | * | 5/1990 | Oikawa ..................... | F16L 5/02 16/2.1 |
| 4,945,193 A | * | 7/1990 | Oikawa ................ | H01B 17/303 174/153 G |
| 5,635,678 A | * | 6/1997 | Yasukuni ............... | H02G 3/088 156/48 |
| 5,981,877 A | * | 11/1999 | Sakata ................ | B60R 16/0222 174/153 G |
| 6,995,317 B1 | * | 2/2006 | Dzurilla ............. | B60R 16/0222 16/2.1 |
| 7,098,401 B1 | * | 8/2006 | Herald ................ | B60R 16/0222 16/2.1 |
| 7,915,534 B2 | * | 3/2011 | Uchibori ............. | B60R 16/0222 16/2.1 |
| 8,108,968 B2 | * | 2/2012 | Pietryga ............... | H02G 3/0468 16/2.1 |

(Continued)

FOREIGN PATENT DOCUMENTS

JP          2015-202847 A          11/2015

*Primary Examiner* — Dhiru R Patel
(74) *Attorney, Agent, or Firm* — Honigman LLP

(57) ABSTRACT

Provided is a grommet and a grommet attachment structure configured to prevent a foreign object from entering. The grommet is externally mounted to a bundle of wires, and to a through hole formed in a panel disposed between a waterproof region and a non-waterproof region, the grommet includes a body portion fitted to the through hole; a waterproof-side protruding portion protrudes from the body portion to the waterproof region side; and a non-waterproof-side protruding portion protrudes from the body portion to the non-waterproof region side. The non-waterproof-side protruding portion includes a tubular portion surrounding the bundle of wires, and a projecting piece portion disposed along a portion of an outer circumference of the bundle of wires.

5 Claims, 3 Drawing Sheets

(56) References Cited

U.S. PATENT DOCUMENTS 8,502,079 B2\* 8/2013 Shitamichi .......... B60R 16/0222
 16/2.1
8,704,099 B2\* 4/2014 Agusa ................. B60R 16/0222
 16/2.2

\* cited by examiner

GROMMET AND GROMMET ATTACHMENT STRUCTURE

CROSS-REFERENCE TO RELATED APPLICATIONS

This application claims priority of Japanese Patent Application No. JP 2017-049548 filed Mar. 15, 2017.

TECHNICAL FIELD

The present invention relates to a grommet and a grommet attachment structure.

BACKGROUND

For example, as a grommet for vehicles such as an automobile, a conventional grommet that is externally mounted to a group of wires of a wire harness and is attached to a through hole formed in a vehicle body panel has been known. The grommet serves the function of protecting a portion of the group of wires of the wire harness that passes through the through hole, and sealing the through hole by being fitted to the through hole.

For example, the grommet described in JP 2015-202847A includes an attachment portion that is fitted to a through hole of a panel, and a tubular portion provided so as to extend in one direction from the attachment portion. The attachment portion has a shape that can be fitted to an opening edge portion of the through hole, and has a wide opening on the front side in the direction of attachment to the panel (the side opposite to the tubular portion). Since the attachment portion has a wide opening, wires can be easily passed through this opening.

SUMMARY

Meanwhile, in the case of attaching a grommet having the above-described configuration to a panel disposed between a non-waterproof region that does not require waterproofing, such as the vehicle interior, and a waterproof region that requires waterproofing, such as the vehicle exterior, the opening of the attachment portion is disposed toward the non-waterproof region side. Therefore, the inside of the grommet is open to the non-waterproof region side. Such a grommet attachment structure can serve the function of protecting the wire group and sealing the through hole. However, the attachment structure is problematic in that it cannot prevent a foreign object from entering the inside of the grommet from the non-waterproof region side.

The present invention has been completed based on the above-described situation, and it is an object of the invention to provide a grommet and a grommet attachment structure that can prevent a foreign object from entering the grommet.

A grommet according to the present invention is a grommet that is to be externally mounted to a bundle of wires, and to be attached to a through hole formed in a panel disposed between a waterproof region and a non-waterproof region, the grommet including: a body portion that is fitted to the through hole; a waterproof-side protruding portion that protrudes from the body portion to the waterproof region side; and a non-waterproof-side protruding portion that protrudes from the body portion to the non-waterproof region side, wherein the non-waterproof-side protruding portion includes a tubular portion that surrounds the bundle of wires, and a projecting piece portion that is disposed along a portion of an outer circumference of the bundle of wires.

A grommet attachment structure according to the present invention is a grommet attachment structure in which a grommet is attached to a through hole formed in a panel disposed between a waterproof region and a non-waterproof region, the attachment structure including: the above-described grommet; a bundle of wires passed through the grommet; and a belt-shaped member that is wound around the bundle of wires, the projecting piece portion, and the tubular portion so as to bring the non-waterproof-side protruding portion into close contact with the bundle of wires.

According to the present invention, the belt-shaped member can be wound around the bundle of wires, the projecting piece portion, and the tubular portion so as to fix the non-waterproof-side protruding portion in a state in which it is in close contact with the bundle of wires, thus closing the opening on the non-waterproof region side. Accordingly, it is possible to prevent a foreign object from entering the grommet from the non-waterproof region side.

DETAILED DESCRIPTION OF PREFERRED EMBODIMENTS

Preferred embodiments of the present invention will be described below.

In a grommet according to the present invention, a plurality of the projecting piece portions may be provided with a slit disposed therebetween, the slit being formed in a protruding end portion of the non-waterproof-side protruding portion. With this configuration, the plurality of projecting piece portions come into close contact with the outer circumferential surface of the bundle of wires so as to close the slit. Accordingly, the operation of winding the belt-shaped member can be easily performed.

In a grommet according to the present invention, the tubular portion may include an easily bendable bending portion that has alternating projections and depressions provided successively in an axial direction. With this configuration, the non-waterproof-side protruding portion can be easily bent to conform with the layout of the bundle of wires.

In a grommet according to the present invention, a plurality of the projecting piece portions may be provided with a slit disposed therebetween, the slit being formed in a protruding end portion of the non-waterproof-side protruding portion, and the tubular portion may include, between the slit and the bending portion, a straight pipe portion that has a flat outer circumferential surface with no projections and depressions. In general, the operation of winding the belt-shaped member around a portion that has projections and depressions is not easy. However, with the configuration of the present invention, the belt-shaped member can be wound around a flat outer circumferential surface with no projections and depressions, and therefore the operation of winding the belt-shaped member can be easily performed.

Embodiment

Figure 1:
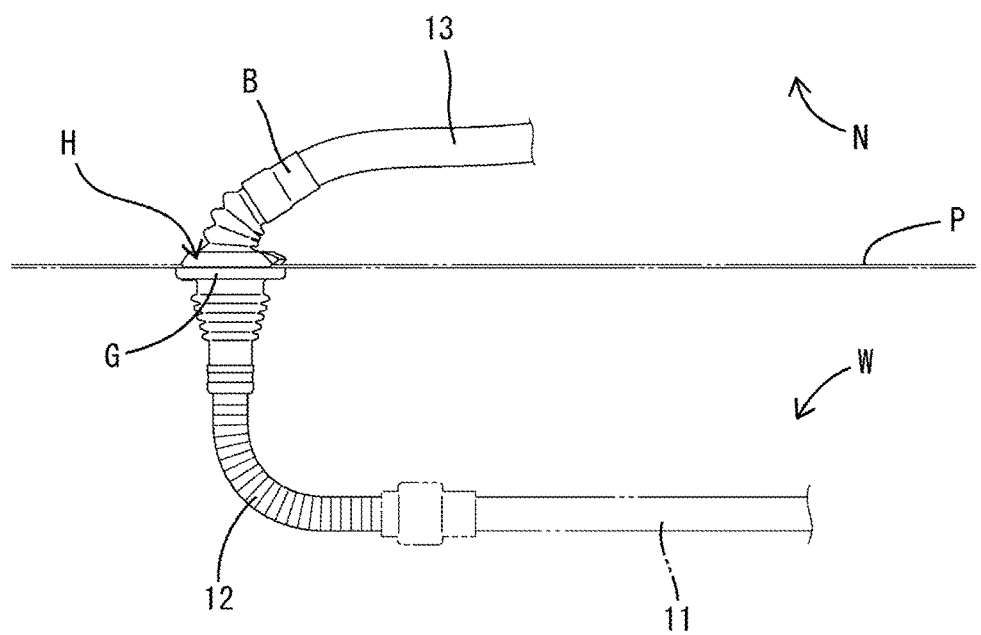
FIG. 1 is a schematic diagram of a grommet according to the present embodiment, showing a state in which the grommet is attached to a vehicle body panel.

Hereinafter, an embodiment of the present invention will be described in detail with reference to FIGS. 1 to 3.

A grommet G of the present embodiment is to be externally mounted to a wire harness that is routed, for example, in a vehicle such as an automobile, and to be attached to a through hole H of a panel P. The panel P is located between a waterproof region (e.g., the vehicle exterior) W that requires waterproofing and a non-waterproof region (e.g., the vehicle interior) N that does not require waterproofing. The grommet G of the present embodiment is attached to the through hole H of the panel P that is located on the underside of a rear seat, as shown in FIG. 1, for example. The through hole H extends through the panel P in the up-down direction, below the seat. The following description assumes that the side of each of the components that faces up (the upper side in FIG. 1) when the component is attached to the vehicle is the upper side, and the side thereof that faces down (the lower side in FIG. 1) is the lower side.

A wire harness is mounted to an electric car or a hybrid car, and includes a plurality of (three in the present embodiment) wires 10, most of which are routed underneath the floor of the vehicle. The wires 10 are high-voltage wires that connect a device (e.g., a motor or an inverter), which is not shown, mounted at the front of the vehicle to a device (e.g., a high-voltage battery), which is not shown, mounted at the rear of the vehicle. A terminal fitting is connected to an end portion of each of the wires 10, and the terminal fitting is housed inside a connector that can be connected to the devices.

A portion of the wires 10 that is disposed underneath the floor of the vehicle is inserted through a long pipe 11 having shielding properties and shape retainability. A portion of the wires 10 that is disposed outside the pipe 11 is surrounded by a tubular shield member (not shown) that has shielding properties and flexibility. The shield member is a braided member obtained by braiding thin metal wires into a tubular shape, metal tape, or the like, and is conductively connected to an end portion of the pipe 11.

Further, portions of the wires 10 that are disposed outside the pipe 11 are surrounded by flexible exterior members 12 and 13. The exterior members 12 and 13 are tubes or the like that have a cylindrical shape. In the present embodiment, a waterproof-side exterior member 12 that surrounds a portion of the bundle of wires 10 that is disposed in the waterproof region W is a corrugated tube, and a non-waterproof-side exterior member 13 that surrounds a portion thereof disposed in the non-waterproof region N is a twist tube.

The grommet G is mainly made of an elastic material (e.g., a rubber or an elastomer, which is a rubber-based material). The grommet G serves the function of water sealing the through hole H so as to prevent the entry of water from the waterproof region W into the non-waterproof region N, and fixing the wire harness to the through hole H.

The grommet G includes a body portion 20 that is fitted to the through hole H, a waterproof-side protruding portion 30 protruding from the body portion 20 to the waterproof region W side, and a non-waterproof-side protruding portion 40 protruding from the body portion 20 to the non-waterproof region N side. The grommet G as a whole has a tubular shape that surrounds the bundle of the wires 10 collectively.

Figure 3:
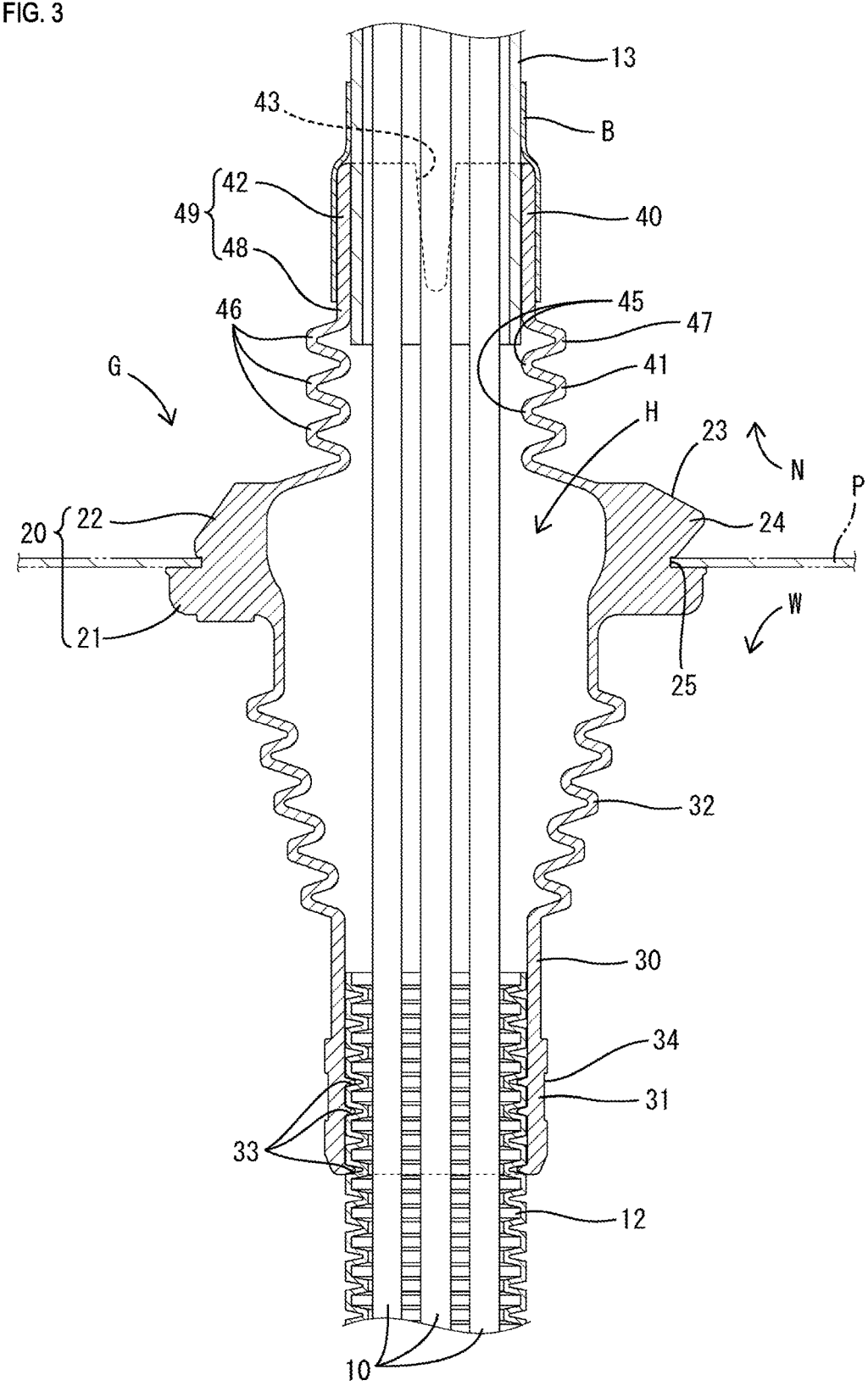
FIG. 3 is a cross-sectional view showing the grommet in a state in which it is attached to the vehicle body panel.

As shown in FIG. 3, the body portion 20 as a whole has the shape of an annular plate that matches the shape of the through hole H, and protrudes radially outward past the other portions (the waterproof-side protruding portion 30 and the non-waterproof-side protruding portion 40). Further, the thickness dimension (radial dimension) of the body portion 20 is set to be larger than that of the other portions.

The body portion 20 includes a portion (hereinafter referred to as a "waterproof-side body portion 21") disposed on the waterproof region W side and a portion (hereinafter referred to as a "non-waterproof-side body portion 22") disposed on the non-waterproof region N side in a state in which the grommet G is attached to the through hole H. The waterproof-side body portion 21 has an outer diameter dimension larger than that of the non-waterproof-side body portion 22, and correspondingly has a larger thickness dimension (radial dimension). The non-waterproof-side body portion 22 has a length dimension in the up-down direction (axial direction) slightly larger than that of the waterproof-side body portion 21.

An inclined surface 23 that is inclined downward from an upper end thereof so as to gradually bulge radially outward is provided on an upper surface of the non-waterproof-side body portion 22. The inclination of the inclined surface 23 allows the body portion 20 to be easily fitted to the through hole H.

Figure 2:
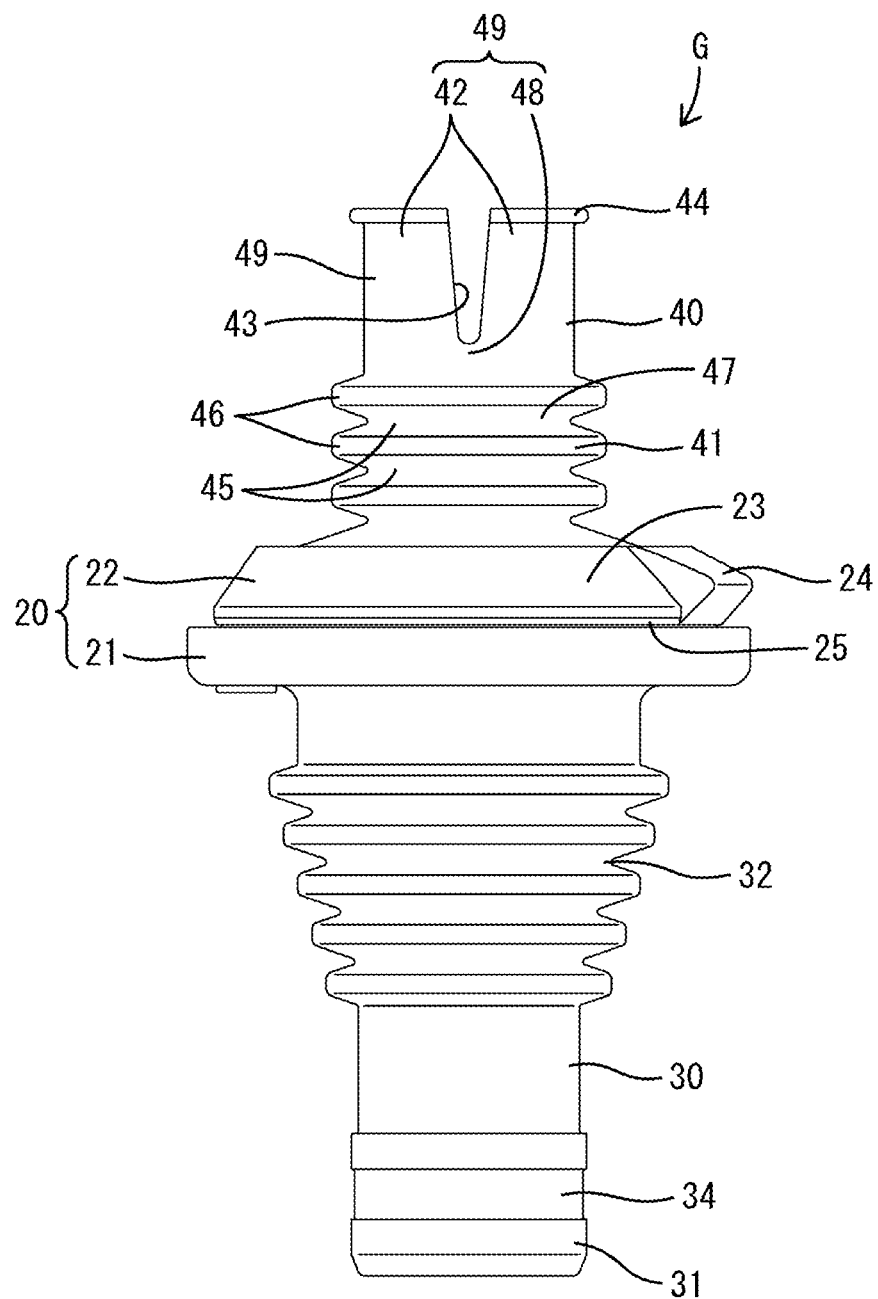
FIG. 2 is a side view showing the grommet.

The non-waterproof-side body portion 22 is provided with a locking pawl portion 24 capable of locking to a peripheral edge portion of the through hole H from the upper side (the non-waterproof region N side) (see FIG. 2). The locking pawl portion 24 protrudes in a horizontal direction (radially outward) at a position higher than another portion of the non-waterproof-side body portion 22. Note that an inclined surface 23 is also formed on the upper surface of the locking pawl portion 24.

A groove portion 25 to which the peripheral edge portion of the through hole H is fitted is provided between the waterproof-side body portion 21 and the non-waterproof-side body portion 22. The peripheral edge portion of the through hole H that has been fitted to the groove portion 25 is sandwiched between the waterproof-side body portion 21 and the non-waterproof-side body portion 22. This restricts the movement (removal) of the grommet G in the up-down direction.

The waterproof-side protruding portion 30 includes a waterproof-side connection portion 31 that is connected to an end portion of the waterproof-side exterior member 12, and an intermediate portion 32 disposed between the waterproof-side connection portion 31 and the body portion 20.

The waterproof-side connection portion 31 has a cylindrical shape with a size that can be externally fitted to the waterproof-side exterior member 12. A locking protrusion 33 for locking to the waterproof-side exterior member 12 protrudes from an inner circumferential surface of the waterproof-side connection portion 31. The locking protrusion 33 is configured to enter a groove of the corrugated tube, and a plurality of the locking protrusions 33 are provided in the present embodiment.

The waterproof-side connection portion 31 is fastened with a binding band or the like (not shown) on the outer circumference side so as to be fixed to the waterproof-side exterior member 12. On the outer circumferential surface of the waterproof-side connection portion 31, a band fixing portion 34 to which the binding band or the like is fastened is formed in a groove shape around the entire circumference. The waterproof-side connection portion 31 comes into close contact with the waterproof-side exterior member 12 in a liquid-tight manner, thus preventing water from entering the grommet G from between the waterproof-side connection portion 31 and the waterproof-side exterior member 12.

The intermediate portion 32 has a tubular shape with inner and outer diameter dimensions that both gradually decrease from the body portion 20 toward the waterproof-side connection portion 31. The intermediate portion 32 has a bellow shape with alternating projections and depressions provided successively in the axial direction (up-down direction).

The non-waterproof-side protruding portion 40 has a cylindrical shape surrounding the non-waterproof-side exterior member 13, and is disposed along the outer circumferential surface of the non-waterproof-side exterior member 13. The non-waterproof-side protruding portion 40 has a substantially constant inner diameter dimension over the entire length thereof. The non-waterproof-side protruding portion 40 and the waterproof-side protruding portion 30 are formed coaxially. The non-waterproof-side protruding portion 40 has an axial dimension (dimension in the up-down direction) smaller than that of the waterproof-side protruding portion 30.

The non-waterproof-side protruding portion 40 includes a tubular portion 41 surrounding the entire outer circumference of the wires 10, and a projecting piece portion 42 disposed along a portion of the outer circumference of a bundle of the wires 10.

The tubular portion 41 is provided as a portion that is substantially half of the non-waterproof-side protruding portion 40 that is located on the body portion 20 side. The tubular portion 41 has a cylindrical shape, and protrudes in the axial direction from substantially the center of the body portion 20. As shown in FIG. 3, the inner diameter dimension of the tubular portion 41 is set to be smaller than the inner diameter dimension of the body portion 20.

The tubular portion 41 includes an easily bendable bending portion 47 that has alternating projections and depressions provided successively in the axial direction (hereinafter referred to as "troughs 45" and "ridges 46"). The bending portion 47 has a bellow shape, and can be easily bent in conformity with the routing configuration of the wire harness in the non-waterproof region N. The bending portion 47 includes a plurality of (three in the present embodiment) ridges 46 and troughs 45 therebetween. The number of the ridges 46 in the bending portion 47 is set to be smaller than the number of ridges that form the bellow shape of the waterproof-side protruding portion 30.

The tubular portion 41 includes, between a slit 43, which will be described later, and the bending portion 47, a straight pipe portion 48 that has a flat outer circumferential surface with no projections and depressions. The outer circumferential surface of the straight pipe portion 48 is formed as a surface that is flat over the entire circumference. The straight pipe portion 48 is located at the central portion of the non-waterproof-side protruding portion 40 in the up-down direction. The straight pipe portion 48 has an annular shape with a dimension in the up-down direction smaller than that of the slit 43 and the bending portion 47. The straight pipe portion 48 protrudes upward from a base of a ridge 46 of the bending portion 47 that is located on the uppermost side (the end in the axial direction).

The projecting piece portion 42 is provided as a portion that is substantially half of the non-waterproof-side protruding portion 40 that is not located on the body portion 20 side. A plurality of (two in the present embodiment) projecting piece portions 42 are provided with a slit 43 disposed therebetween, the slit 43 being open at the upper end (the protruding end of the non-waterproof-side protruding portion 40)

As shown in FIG. 2, the slit 43 is cut out downward from the upper end of the non-waterproof-side protruding portion 40. The slit 43 has a shape with a dimension in the up-down direction larger than a width dimension (the circumferential dimension of the non-waterproof-side protruding portion 40), or in other words, a shape that is elongated in the up-down direction. The slit 43 has a V-shape with a width dimension that gradually decreases downward from the upper end.

A pair of slits 43 are provided in the non-waterproof-side protruding portion 40. The pair of slits 43 have the same shape. The pair of slits 43 are formed at one end side and another end side of the non-waterproof-side protruding portion 40 in the radial direction. The pair of slits 43 are symmetrical with respect to the axis of the non-waterproof-side protruding portion 40.

Each projecting piece portion 42 is a portion of the non-waterproof-side protruding portion 40 that is located between slits 43. A pair of the projecting piece portions 42 are provided so as to oppose each other. The pair of projecting piece portions 42 are symmetrical with respect to the axis of the non-waterproof-side protruding portion 40. Each projecting piece portion 42 has a circular arc shape when viewed from the axial direction of the non-waterproof-side protruding portion 40. Further, each projecting piece portion 42 has a width dimension that gradually decreases from the tubular portion 41 side (the proximal end side) toward the distal end side (the free end side). At an end edge portion of each projecting piece portion 42, a protruding portion 44 is provided so as to protrude radially outward. The protruding portions 44 are provided spanning the entire width of each projecting piece portion 42.

As shown in FIG. 3, the projecting piece portions 42 and the straight pipe portion 48 are configured to form a portion (hereinafter referred to as a "wound portion 49") around which a belt-shaped member B is wound. Note that the inner diameter dimensions of the projecting piece portions 42, the straight pipe portion 48, and the troughs 45 of the bending portion 47 are set to be equal.

The belt-shaped member B is a band-shaped member such as adhesive tape or a binding band that has a length dimension that allows it to be wound around the outer circumference of the non-waterproof-side protruding portion 40. As shown in FIG. 3, the belt-shaped member B is wound from the non-waterproof-side exterior member 13 exposed in the non-waterproof region N, over the non-waterproof-side protruding portion 40. The belt-shaped member B is wound around the wound portion 49 of the non-waterproof-side protruding portion 40 so as to bring the upper end portion of the non-waterproof-side protruding portion 40 into close contact with the non-waterproof-side exterior member 13.

Next, an example of a wire harness assembly operation of the present embodiment will be described.

First, the bundle of wires 10 is inserted through the pipe 11, and the waterproof-side exterior member 12, the grommet G, and the non-waterproof-side exterior member 13 are placed in this order so as to cover the bundle of wires 10 led out from the pipe 11 to the outside. Then, one end portion of the waterproof-side exterior member 12 is fixed to an end portion of the pipe 11, and the grommet G is connected to the other end portion of the waterproof-side exterior member 12. When the grommet G is placed so as to cover the bundle of the wires 10, the space between the pair of projecting piece portions 42 can be widened, so that the operation can be easily performed An end portion of the non-waterproof-side exterior member 13 is inserted up to a basal portion (the boundary with the body portion 20), or an intermediate position (e.g., the near side of the bending portion 47) of the non-waterproof-side protruding portion 40 of the grommet G. Then, the belt-shaped member B is wound over the wound portion 49 of the non-waterproof-side protruding portion 40 from the non-waterproof-side exterior member 13 so as to close the gap between the non-waterproof-side exterior member 13 and the non-waterproof-side protruding portion 40. Note that a stretch of a belt-shaped member B may be wound in a spiral pattern such that the wound position is gradually shifted in the axial direction, or a plurality of belt-shaped members B may be wound at positions that are gradually shifted in the axial direction.

The pair of projecting piece portions 42 are brought closer to each other so as to narrow the slits 43, and come into close contact with the outer circumferential surface of the non-waterproof-side exterior member 13. The amount by which the slits 43 are narrowed is adjusted to suit the outer diameter dimension of the non-waterproof-side exterior member 13. Since the slits 43 have a V-shape and the projecting piece portions 42 have a tapered shape, the projecting piece portions 42 can easily come into close contact with the outer circumferential surface of the non-waterproof-side exterior member 13. Consequently, a gap is unlikely to be formed between each of the projecting piece portions 42 and the non-waterproof-side exterior member 13.

In a state in which the pair of projecting piece portions 42 are in close contact with the outer circumferential surface of the non-waterproof-side exterior member 13, the belt-shaped member B is wound around the entire circumference of the non-waterproof-side exterior member 13, together with the pair of projecting piece portions 42. Consequently, the non-waterproof-side protruding portion 40 is firmly fixed to the non-waterproof-side exterior member 13. Further, the belt-shaped member B is wound around the entire circumference of the straight pipe portion 48 so as to close the lower end portions of the slits 43. Consequently, the gap between the non-waterproof-side protruding portion 40 and the non-waterproof-side exterior member 13 is completely closed.

Thereafter, the pipe 11 is bent into a predetermined shape using a bender machine, and a connector is connected to the end portion of the bundle of wires 10.

The wire harness assembly operation is thereby completed.

Next, an example of an operation of passing a wire harness through the through hole H of the panel P according to the present embodiment will be described.

A portion of the wire harness that is disposed on the non-waterproof region N side is passed through the through hole H from the waterproof region W side so as be pulled out to the non-waterproof region N side. The non-waterproof-side protruding portion 40 of the grommet G is passed through to the non-waterproof region N side, and the body portion 20 is pushed into the through hole H so as to be fitted thereto. The inclined surface 23 of the non-waterproof-side body portion 21 is abutted against the peripheral edge portion of the through hole H. The non-waterproof-side body portion 21 passes through the through hole H as a result of being elastically deformed such that its diameter is reduced, and is disposed on the non-waterproof region N side. The locking pawl portion 24 is locked to the peripheral edge portion of the through hole H. The peripheral edge portion of the through hole H is fitted to the groove portion 25, and the body portion 20 comes into close contact with the peripheral edge portion of the through hole H, thus sealing the through hole H. In this manner, the attachment operation of the grommet G is completed.

Next, a portion of the wire harness that is disposed in the non-waterproof region N is bent into a predetermined routing configuration. At this time, providing the bending portion 47 at the non-waterproof-side protruding portion 40 makes it possible to bend the non-waterproof-side protruding portion 40 in any given direction (e.g., a horizontal direction such as toward the rear of the vehicle). The operation of passing the wire harness through the through hole H of the panel P is thereby completed.

Next, the operation and effects of the embodiment configured as described above will be described.

The grommet G of the present embodiment is to be externally mounted to a bundle of wires 10, and to be attached to a through hole H formed in a panel P disposed between a non-waterproof region N and a waterproof region W, the grommet including: a body portion 20 that is fitted to the through hole H; a waterproof-side protruding portion 30 that protrudes from the body portion 20 to the waterproof region W side; and a non-waterproof-side protruding portion 40 that protrudes from the body portion 20 to the non-waterproof region N side, wherein the non-waterproof-side protruding portion 40 includes a tubular portion 41 that surrounds the bundle of wires 10, and a projecting piece portion 42 that is disposed along a portion of an outer circumference of the bundle of wires 10.

With this configuration, the belt-shaped member B can be wound around the bundle of wires 10, the projecting piece portion 42, and the tubular portion 41 so as to fix the non-waterproof-side protruding portion 40 in a state in which it is in close contact with the bundle of wires 10, thus closing the opening of the grommet G on the non-waterproof region N side. Accordingly, it is possible to prevent a foreign object (e.g., mud or dirt) from entering the grommet G from the non-waterproof region N side.

Further, a pair of the projecting piece portions 42 are provided with the slits 43 disposed therebetween, the slits 43 being formed in the protruding end portion of the non-waterproof-side protruding portion 40. With this configuration, the pair of projecting piece portions 42 come into close contact with the outer circumferential surface of the bundle of wires 10 so as to close the slits 43. Accordingly, the operation of winding the belt-shaped member B can be easily performed.

Further, the tubular portion 41 includes an easily bendable bending portion 47 that has alternating projections and depressions provided successively in the axial direction. With this configuration, the non-waterproof-side protruding portion 40 can be easily bent to conform with the layout of the bundle of wires 10.

Further, the tubular portion 41 includes, between the slits 43 and the bending portion 47, the straight pipe portion 48 with a flat outer circumferential surface. In general, the operation of winding the belt-shaped member B around a portion that has projections and depressions is not easy. However, with the configuration of the present embodiment, the belt-shaped member B can be wound around a flat outer circumferential surface with no projections and depressions, and therefore the operation of winding the belt-shaped member B can be easily performed.

Other Embodiments

The present invention is not limited to the embodiment described by the above statements and drawings, and, for example, the following embodiments also fall within the technical scope of the present invention.

(1) In the above embodiment, a case is described where the non-waterproof region N is the vehicle interior and the waterproof region W is the vehicle exterior. However, the non-waterproof region or the waterproof region is not limited to the vehicle interior or exterior.

(2) In the above embodiment, a case is described where the grommet G is attached to the through hole H penetrating in the up-down direction. However, the present invention is not limited thereto, and the grommet may be attached to a through hole penetrating in any direction (e.g., a horizontal direction).

(3) In the above embodiment, a specific configuration of the waterproof-side protruding portion 30 is illustrated. However, the present invention is not limited thereto, and the configuration of the waterproof-side protruding portion may be freely changed.

(4) In the above embodiment, the non-waterproof-side protruding portion 40 comes into close contact with the non-waterproof-side exterior member 13 that surrounds the bundle of wires 10. However, the present invention is not limited thereto. For example, when the bundle of wires is not covered with an exterior member, the non-waterproof-side protruding portion may directly come into close contact with the outer circumferential surface of the bundle of wires.

(5) In the above embodiment, the pair of projecting piece portions 42 are provided with the slits 43 disposed therebetween. However, the present invention is not limited thereto, and three or more projecting piece portions may be provided with slits disposed therebetween.

(6) In the above embodiment, the pair of projecting piece portions 42 are provided with the slits 43 disposed therebetween. However, the present invention is not limited thereto, and only one projecting piece portion may protrude from the tubular portion.

What is claimed is:

1. A grommet that is to be externally mounted to a bundle of wires, and to be attached to a through hole formed in a panel disposed between a waterproof region and a non-waterproof region, the grommet comprising:
    a body portion having a waterproof-side portion and a non-waterproof side portion and a groove portion disposed between the waterproof-side portion and the non-waterproof side portion, wherein the body portion is fitted to the through hole and the panel engages the groove portion;
    a waterproof-side protruding portion that protrudes from the body portion to the waterproof region side; and
    a non-waterproof-side protruding portion that protrudes from the body portion to the non-waterproof region side, wherein
    the non-waterproof-side protruding portion includes a tubular portion that surrounds the bundle of wires, and a projecting piece portion that is disposed along a portion of an outer circumference of the bundle of wires; and
    a belt-shaped member that is wound around the bundle of wires, the projecting piece portion, and the tubular portion so as to bring the non-waterproof-side protruding portion into close contact with the bundle of wires.

2. The grommet according to claim 1, wherein
    a plurality of the projecting piece portions are provided with a slit disposed therebetween, the slit being formed in a protruding end portion of the non-waterproof-side protruding portion.

3. The grommet according to claim 1, wherein
    the tubular portion includes an easily bendable bending portion that has alternating projections and depressions provided successively in an axial direction.

4. The grommet according to claim 3, wherein
    a plurality of the projecting piece portions are provided with a slit disposed therebetween, the slit being formed in a protruding end portion of the non-waterproof-side protruding portion, and
    the tubular portion includes, between the slit and the bending portion, a straight pipe portion that has a flat outer circumferential surface with no projections and depressions.

5. A grommet attachment structure in which a grommet is attached to a through hole formed in a panel disposed between a waterproof region and a non-waterproof region, the attachment structure comprising:
    the grommet according claim 1;
    a bundle of wires passed through the grommet.

* * * * *